June 30, 1959  G. H. AMONSEN  2,892,354
VARIABLE SPEED PULLEY
Filed Dec. 13, 1957
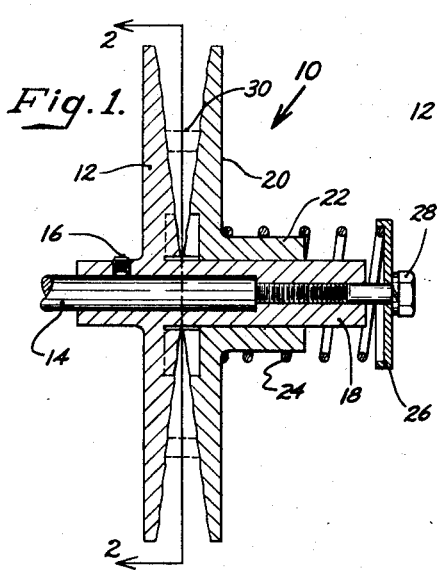
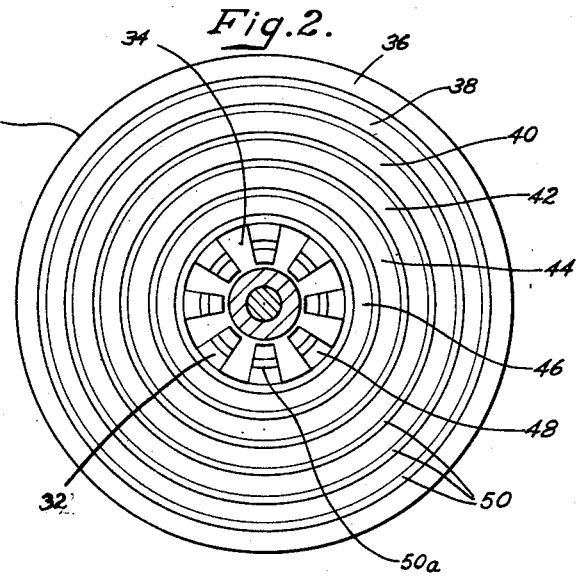
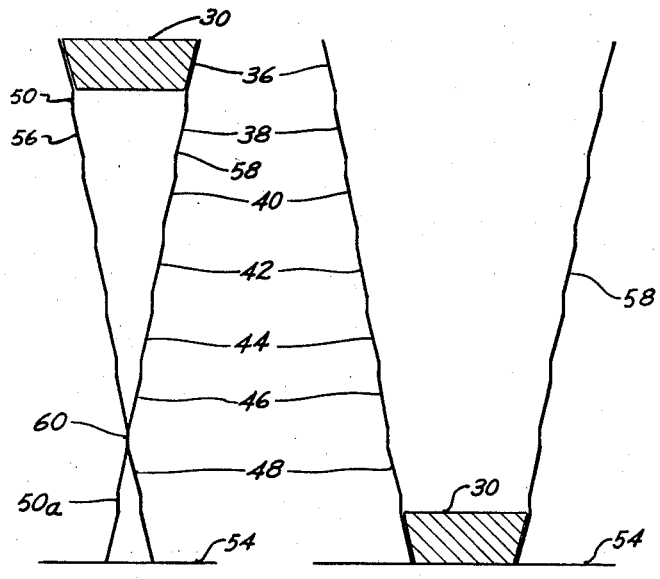
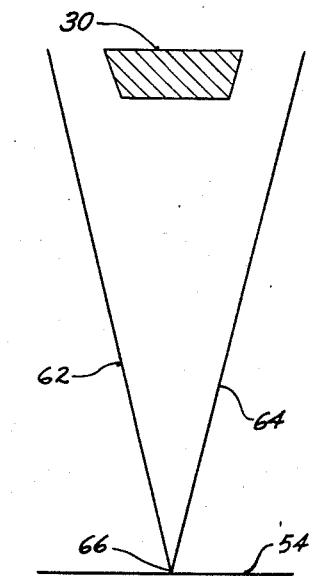
INVENTOR.
George H. Amonsen
BY 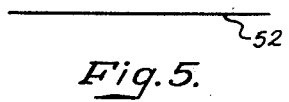
ATTORNEYS.

United States Patent Office 2,892,354
Patented June 30, 1959

2,892,354

VARIABLE SPEED PULLEY

George H. Amonsen, Minneapolis, Minn.

Application December 13, 1957, Serial No. 702,705

4 Claims. (Cl. 74—230.17)

This invention relates to improvements in variable speed pulleys. In general, the invention is concerned with obtaining a greater range of belt speeds from a variable speed pulley composed of a pair of relatively movable discs that are adapted to engage a V-shaped belt between their inner surfaces.

Variable speed pulleys of the class to which the present invention pertains are composed of a pair of discs mounted on a common axis and each formed with an inclined face on its inner surface so as to provide, with the other disc, a V-shaped groove into which the driving belt fits. With pulleys of the prior art, the inclined face on the inner surface of each of the discs is a smooth surface generally formed on a single inclined plane, which to be effective must extend at an angle equal to the angle on the sides of the belt so as to fully grip the belt by frictional contact. While such pulleys are subject to lateral adjustment, such as for example one being biased in the direction of the other, because the inner surfaces are each formed on a single curve, the range of belt speeds that may be obtained is relatively limited.

In the present invention, I have provided an improved variable speed pulley in which at least one of the discs is formed with a series of coaxial annular steps or inclined planes on the inner surface thereof, which steps or inclined planes each extend at an angle equal to the angle of the side surface of the belt, and thereby provide a series of coaxial surfaces that are annular in nature between the outer and inner limits of the pulley. Each of said coaxial surfaces is separated, and in the space between each of said surfaces is formed an annular band which lies in a plane transverse to the axis of the disc. These several bands serve to distinctly separate each of the annular steps, and serve the important function of providing a greater range of belt speeds. The width of each of said bands is less than the normal thickness of the belt so that if the belt should be partially lodged on one of the bands, there is sufficient surface to grip the side of the belt.

An object of the invention is to provide a variable speed pulley that provides a greater range of belt speeds than has heretofore been obtainable.

Another object is to provide a variable speed pulley embodying a pair of belt engaging discs, supported for rotation about a common axis, one of which is laterally movable relative to the other along said axis, and in which the inner belt engaging surface of at least one of said discs is provided with a series of fixed annular belt engaging steps that are coaxially spaced with relation to each other, and in which an annular band is formed between each of the coaxial steps, said bands extending in planes transverse to the axis of rotation of the disc, and which serve the function of increasing the range of belt speeds between the discs.

A further object is to provide a variable speed pulley composed of a pair of discs mounted on a common axis in which each of the discs has formed on its inner surface a series of coaxial steps each extending at an angle that is coincident with the angular slope of the sides of a belt that is held between the discs, and in which each annular step on each disc is separated from the adjacent steps by an annular band that extends in a plane which is transverse to the axis of rotation of the discs.

Other and further objects may become apparent from the following specification and claims, and in the appended drawing in which:

Fig. 1 is a sectional elevation of a variable speed pulley forming the present invention;

Fig. 2 is a plan view of one of the discs taken on the lines 2—2 of Fig. 1;

Fig. 3 is an enlarged schematic diagram of a section of the pulley shown in Fig. 1, with the belt located at the upper extremity of the discs;

Fig. 4 is a schematic diagram of a similar nature to that disclosed in Fig. 3 with the belt located at the inner extremity of the two discs; and, Fig. 5 is a similar schematic diagram of a conventional pulley and clearly illustrates the advantages of the present invention.

Referring now to the several views of the drawing, the invention will be described in detail.

General reference numeral 10 indicates in its entirety a variable speed pulley which is composed of an annular disc 12 that is secured to a shaft 14 by a set screw 16. Disc 12 is provided with an annular core 18 on which is loosely journaled a second disc 20 formed with a shoulder portion 22. The two discs are held in abutting relationship with each other by a coil spring 24 that encircles the shoulder portion 22 of disc 20, and abuts a cap 26 that is engaged by a machine screw 28 that is threaded into the core portion 18 of disc 12.

An endless belt designated by reference character 30 is positioned between the discs 12 and 20, and in Fig. 1 is shown as two separated portions on opposite sides of the axis of the two discs. The belt 30 is a conventional belt commonly referred to as a V-belt, whose lateral sides incline inwardly from the top or outer surface of the belt to the bottom or inner side thereof. The angle of inclination or slope of these belts is uniform for each specific size of the belt, and as here disclosed, the angle of inclination is substantially 11° from the perpendicular; however, it should be understood that the angle of slope may vary from this angle.

Referring now to Fig. 2, each of the discs adjacent its core is formed with a multiplicity of radial extending spokes 32 that are separated from each other by radial extending spaces 34. When the two discs are positioned in the manner disclosed in Fig. 1, and biased towards each other by the coil spring 24 and the parts that co-act therewith, the spokes of one of the discs project into the spaces 34 of the other disc so that the inner limits of the two discs will normally overlap adjacent their axes when the belt 30 is absent from the discs or it is situated between the two discs adjacent their peripheries.

Referring again to Fig. 2, in conjunction with Figs. 3 and 4, each of the discs 12 and 20 on its inner surface is formed with a series of annular steps designated by reference characters 36, 38, 40, 42, 44, 46 and 48, all of which are coaxial.

Each of these several steps are formed on an angle that is similar to the angular slope of the sides of belt 30, which in the present disclosure is 11° from the vertical. Between each of said annular steps, there is provided an annular band designated by the common reference character 50. Each of these bands lie in planes that are substantially at right angles to the axis of rotation of the discs. The innermost of these bands designated at 50a is formed on the spokes 32 adjacent the axis of each of the discs. As clearly shown in Figs. 3 and 4, the width of each of the bands 50 is less than the thickness of belt 30, so that the belt 30 could never be lodged with the full depth of its sides between opposing bands, and one part of the belt would always be engaged by one of the several annular steps 36-48.

Having reference to Figs. 3 and 4, the pulley described heretofore is schematicaly disclosed with the belt 30 alternately shown at the outer and inner limits of the pulley. In both of these figures, the line 52 is representative of the axis of rotation of the pulley, while line 54 is representative of the periphery of the pulley hub. Reference characters 56 and 58 are representative of the internal surfaces of the two discs 12 and 20 with the several annular stepped surfaces 36-48 formed thereon and with each of the several stepped surfaces separated by a band 50, including the innermost band 50a formed on the spokes 32 of each of the discs. In Fig. 3, belt 30 is in engagement with the outermost annular surfaces 36, and because of the intermeshing of the spokes 32 into the spaces 34 of each of the discs the point of intersection is indicated at 60. In Fig. 4, belt 30 is in contact with the innermost annular surface, and the two discs are held in separated relationship. It is understood, of course, that the discs 12 and 20 are biased in the direction of each other through the action of the coil spring 24 and its associated parts.

Having reference to Fig. 5, is a diagrammatic representation of a conventional pulley whose inner surfaces indicated by reference characters 62, 64, diverge from each other on a single plane of the same angle as the side surfaces of belt 30. This figure is intended to illustrate the limitations of a conventional pulley whose surfaces extend outwardly on a single sloping plane from a center point 66 at the periphery of hub 54. It will be observed that the belt 30 is not contacted by the surfaces 62, 64 when the surfaces 62, 64 meet at the point 66. While it might be possible to provide spokes similar to elements 32, 32, nevertheless, when such an arrangement is provided, the limitation in the range of belt speeds is still much less than can be obtained with the present structure.

In operation, the variable speed pulley, indicated by general reference numeral 10, is used with a driving or driven member operably connected to shaft 14. To change the speed of belt 30, the device is moved in either lateral direction of the shaft so the belt 30 is caused to move either towards or away from the axis of shaft 14. This action causes the discs 12 and 20, under the influence of spring 24, to engage the belt between any pair of stepped angular surfaces 36-48, which since they all slope at a uniform angle, will fully grip the sloping side surfaces of the belt 30. In the event that the belt is located partially between two of the stepped surfaces, the intermediate band 50 and a part of the stepped surfaces will substantially grip the sides of the belt, so that there can be no material loss of friction.

From the foregoing discussion, the advantages of the present invention should now be apparent. In particular, the several steps or bands 36-48 separated by the bands 50, 50a increase the range of speeds of the pulley beyond the range of speeds that are available in pulleys whose inner surfaces extend on a single sloping surface. Furthermore, if the belt is in a position between any two of the angular bands, the band 50 will provide a good gripping surface with the belt.

The invention is defined in the terms of the appended claims.

I claim:

1. In a variable speed pulley, embodying a pair of circular discs supported for rotation about a common axis, the inner surface of each of said discs sloping outwardly from the axis to the peripheral limits thereof, said discs adapted for relative lateral movement along the common axis to engage the lateral surfaces of a V-shaped belt between their inner faces, the improvement consisting of a multiplicity of coaxial steps formed on the inner surface of each of said discs, each of said steps sloping outwardly from the inner surface of each of said discs at an angle substantially equal to the angle of slope of the side surface of said belt, and spacing means formed on the inner surface of each of said discs between said coaxial steps to separate said steps and increase the range of belt engaging surfaces between said discs.

2. In a variable speed pulley, embodying a pair of circular discs supported for rotation about a common axis, the inner surface of each of said discs sloping outwardly from the axis to the peripheral limits thereof, said discs adapted to engage the lateral surfaces of a V-shaped belt between their inner faces, the improvement consisting of a multiplicity of spaced coaxial steps formed on the inner surface of each of said discs, each of said steps sloping outwardly from the inner surface of each of said discs at an angle substantially equal to the angle of slope of the side surface of said belt, and a band formed on the inner surface of each of said discs between each of said coaxial steps, the width of said band being less than the thickness of said belt to separate said steps and increase the range of belt engaging surfaces between said discs.

3. In a variable speed drive, embodying a pair of discs supported for rotation about a common axis and adapted for relative lateral movement along said axis to engage an endless belt between their inner faces, the improvement consisting of a plurality of fixed coaxial steps formed on the inner face of at least one of said discs, and an annular band formed on said face between said annular steps, said band extending in a plane transverse to the axis of rotation of said discs and serving to separate said annular steps.

4. In a variable speed drive, embodying a pair of discs supported for rotation about a common axis and adapted for relative lateral movement along said axis to engage an endless belt between their inner faces, the improvement consisting of a plurality of fixed coaxial steps formed on the inner face of at least one of said discs, and an annular band formed on said face between said annular steps, said band extending in a plane transverse to the axis of said discs and being of a width less than the width of said steps.

References Cited in the file of this patent

UNITED STATES PATENTS 2,136,437     Hollestelle _____ Nov. 15, 1938